Figure 1:
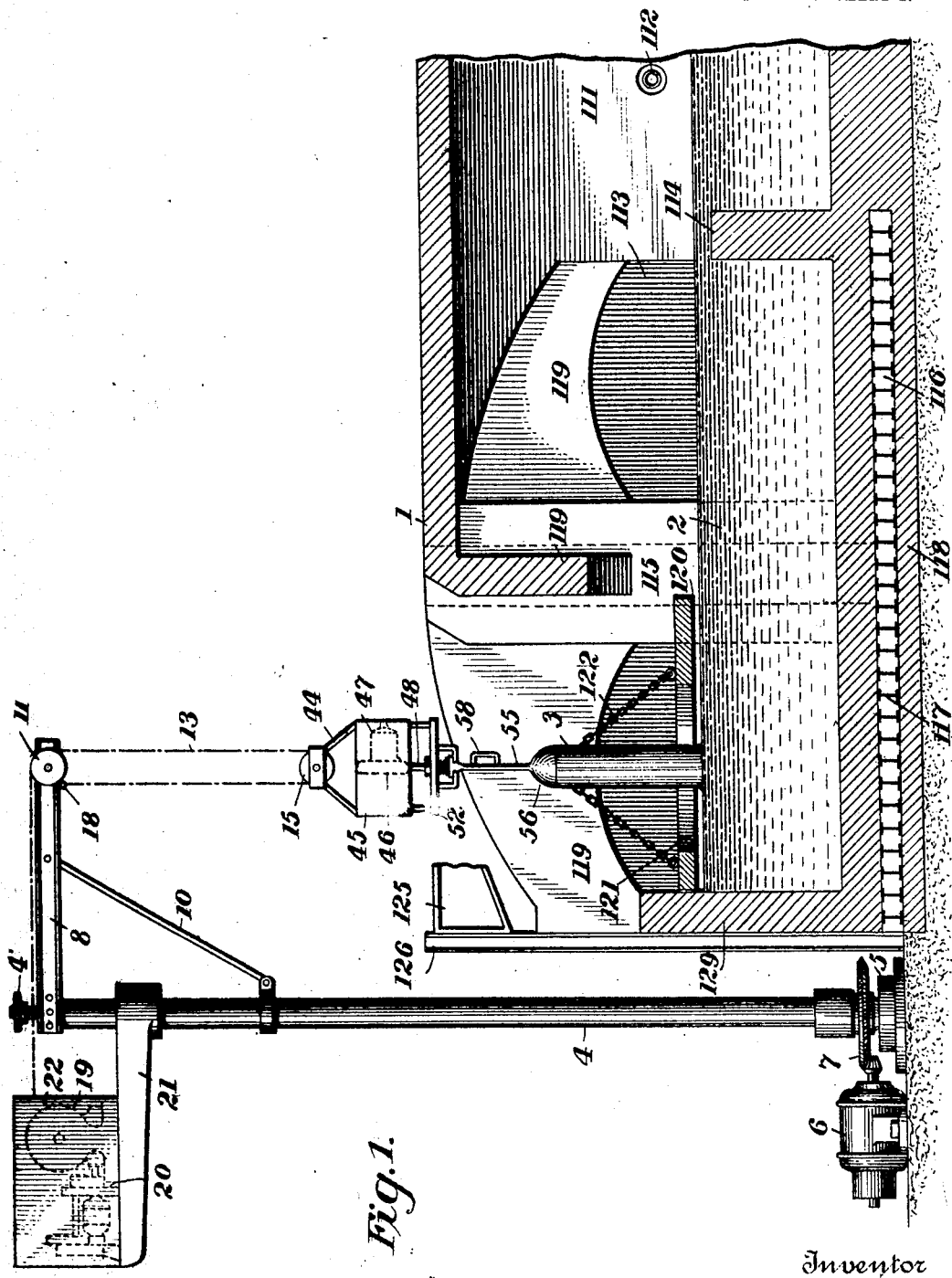

R. H. BOLIN.
APPARATUS FOR GLASS MANUFACTURE.
APPLICATION FILED AUG. 12, 1907.

920,107.

Patented May 4, 1909.
4 SHEETS—SHEET 1.

Witnesses

Inventor
Richard H. Bolin
by Adrian Syer
his Attorneys

R. H. BOLIN.
APPARATUS FOR GLASS MANUFACTURE.
APPLICATION FILED AUG. 12, 1907.
920,107.
Patented May 4, 1909.
4 SHEETS—SHEET 2.
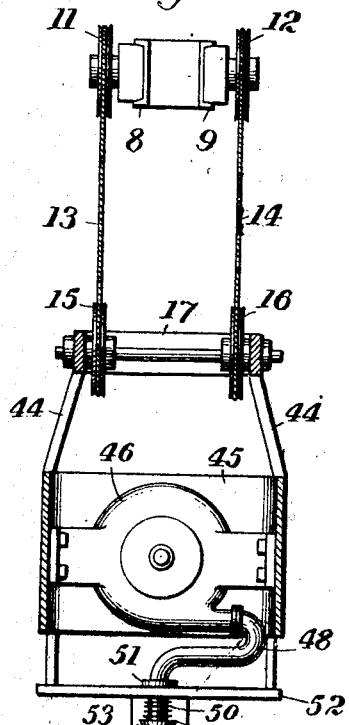
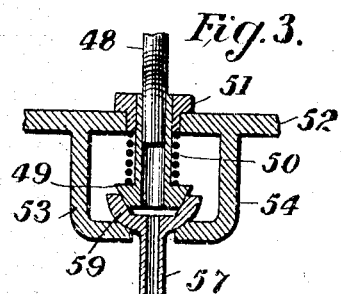
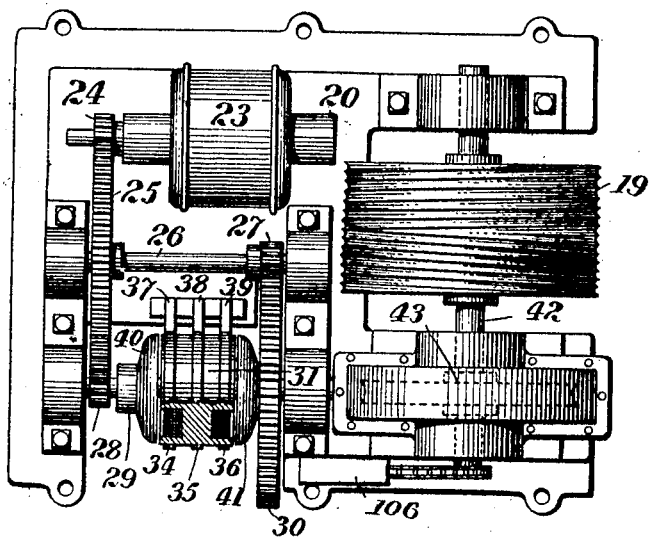
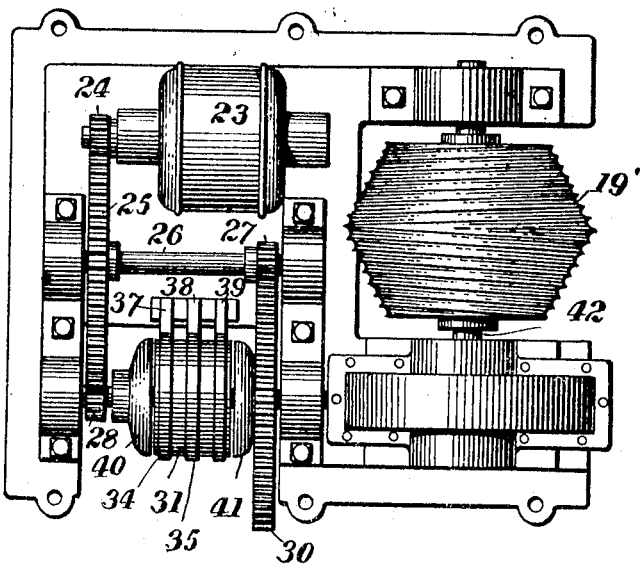

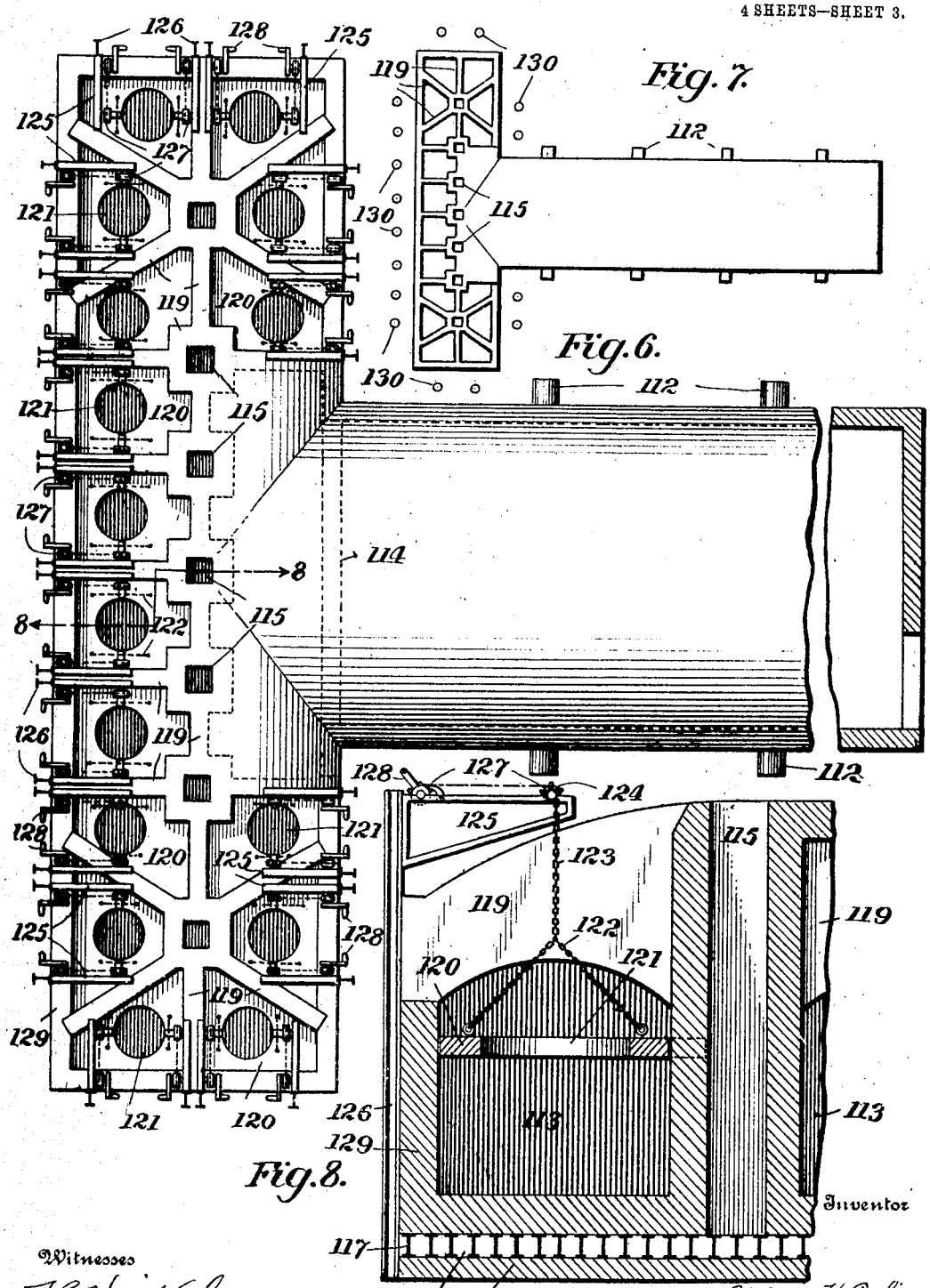

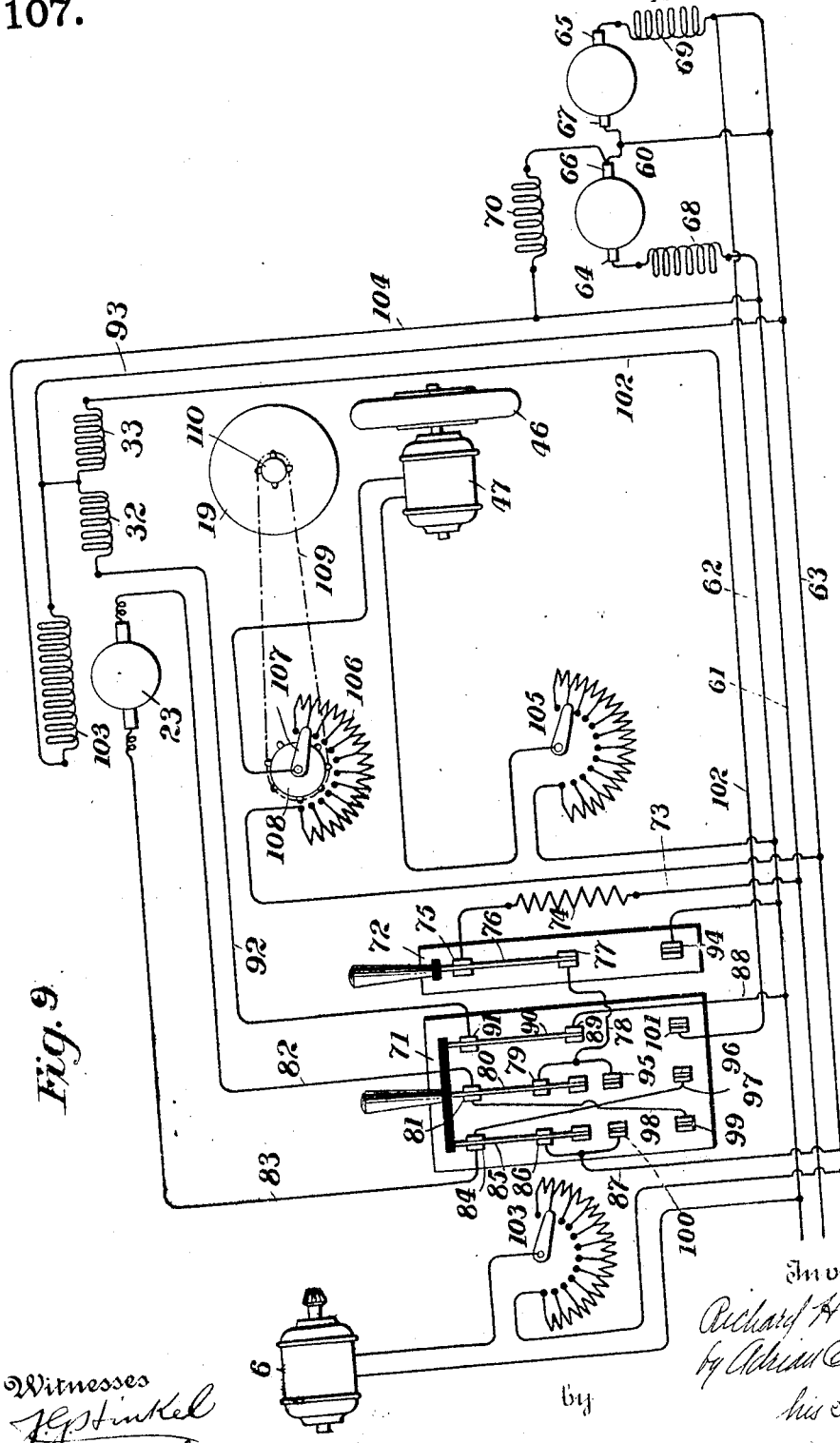

UNITED STATES PATENT OFFICE.

RICHARD H. BOLIN, OF KANE, PENNSYLVANIA.

APPARATUS FOR GLASS MANUFACTURE.

No. 920,107.      Specification of Letters Patent.      Patented May 4, 1909.

Application filed August 12, 1907. Serial No. 388,100.

*To all whom it may concern:*

Be it known that I, RICHARD H. BOLIN, a citizen of the Dominion of Canada, residing at Kane, in the county of McKean and State of Pennsylvania, have invented certain new and useful Improvements in Apparatus for Glass Manufacture, of which the following is a specification.

This invention relates to the formation of glass into proper shape by machinery, and is directed more especially to the formation of glass cylinders or other shapes constituting a step in the manufacture of window or other sheet glass.

The primary object of the invention is to eliminate, in this step of glass manufacture, as far as possible the use of manual labor, and to substitute therefor mechanism which will do the work more economically, with great saving to the health and comfort of the operators, and without sacrificing the well known advantages of hand manufacture.

I have found that the above objects may be accomplished to the best advantage by the employment of electricity wherever possible, both as a primary motive power and as a regulating force, and avail myself of these advantages in carrying out my present invention.

A further object of the invention is an improved arrangement of the cylinder forming apparatus with relation to the receptacle from which the cylinders and other shapes are drawn from the molten glass therein, which consists in arranging a plurality of units to draw separate cylinders or other shapes out of a receptacle common to both or all of said units.

Another object of my said invention is to provide a form of apparatus in which the cylinders or other shapes are drawn directly from the body of the molten glass in the glass tank proper as contradistinguished from apparatus in which the glass is drawn from pots, troughs or extended hearths, the advantages of which will hereinafter more fully appear.

My said invention further relates to an improved form of furnace and tank, and the combination of the same with cylinder drawing apparatus.

My invention further consists in the novel construction and arrangement of parts herein described, and more particularly pointed out in the accompanying claims.

In order to more fully describe my said invention reference will be had to the accompanying drawings, in which, Figure 1, represents partly in side elevation and partly in vertical section, with portions broken away, a form of apparatus embodying my invention, the same being shown in the act of producing a glass cylinder; Fig. 2, an enlarged view showing the blowing apparatus in side elevation, its supporting frame in section, and the front end of the crane-boom and pulleys and hoisting cable in elevation; Fig. 3, an enlarged detail section of the coupling between the duct from the blower and the upper end of the blow pipe; Fig. 4, a top plan view of one of the hoisting drums and its driving mechanism; Fig. 5, a top plan view of said driving mechanism operating a cable drum of different form from the one shown in Fig. 4; Fig. 6, a top plan view, partly in horizontal section, of a form of furnace and glass tank embodying my invention; Fig. 7, a semi-diagrammatic view of said furnace and tank and the cylinder forming units arranged around it; Fig. 8, a fragmentary vertical section along line 8—8, Fig. 6, and Fig. 9, is a diagram of the electric circuits employed with one of the hoisting and blowing units.

Referring to the accompanying drawings, 1 represents a glass furnace of novel construction which will be described in detail later on in this specification; 2, molten glass in said furnace, and 3, a hollow glass cylinder being drawn from said molten glass. For the purpose of forming these cylinders, I provide one or more cylinder-forming units each of which comprises in the case shown, mechanism to hoist the cylinders, mechanism to blow the cylinders, and means controlled by the hoisting mechanism either directly or indirectly to govern the cylinder blowing mechanism. This hoisting mechanism may consist, among other parts, as shown in the drawings, of a crane consisting of an upright or mast 4 pivotally mounted in a suitable bearing 5 for rotation on its vertical axis, which rotation may be effected in any desired manner. The arrangement which I have shown for this purpose consists of an electric motor 6 directly geared to a bevel gear 7, mounted on the lower portion of the mast 4. The upper end of the mast 4 is adapted to turn in a guy cap 4′, whereby the mast is retained in the correct vertical position. From the upper end of the mast 4 extends a gib consisting of two parallel I-beams 8 and 9 made fast to one end to the top of the mast 4 and suitably stayed by means of brace 10. Journaled near the ends of said I-beams are two peripherally grooved pulleys, 11 and 12, over which pass respectively hoisting cables 13 and 14. These cables then pass over and support pulleys 15 and 16 of a swinging block 17, and thence to a point 18 on each of the beams 8 and 9 where they are made fast to said beams. The other ends of the cables 13 and 14 pass to a hoisting sheave 19 or drum connected to suitable driving mechanism 20. This cable drum and driving mechanism may be mounted upon an arm or bracket 21 near the top of the mast 4, and is inclosed in a suitable housing 22. This way of mounting the drum and its driving mechanism is particularly advantageous in that it gets that mechanism out of the way and besides locates it conveniently with respect to the pulleys 11 and 12, and saves a considerable length of hoisting cable by its proximity to said pulleys, also counterbalancing the boom and the weight carried thereby.

The particular form of mechanism which I have shown for driving the cable drum consists, among other parts, (see Fig. 4) of an electric motor 23, the armature shaft of which is geared through a pinion 24 thereon to a larger gear 25 mounted fast on a counter-shaft 26, upon which latter is also mounted fast a pinion 27. The gear 25 meshes with a pinion 28 mounted loosely on a shaft 29 and adapted to rotate relatively thereto. The pinion 27 meshes with a large gear 30 also loosely mounted on shaft 29 to rotate relatively thereto. Rotation is transmitted to the shaft 29 from either the pinion 28 or gear 30 by means of a magnetic clutch which may be of any desired construction; the one shown in the accompanying drawing being of well known construction, and consisting of a central clutch member 31 of magnetic metal in the ends of which are mounted two magnetizing coils 32 and 33 connected in any suitable way to collector rings 34, 35 and 36, which engage respectively three brushes 37, 38 and 39, for conveying the energizing current to and away from said coils, as is well understood in the art, but which will be described more fully in connection with the description of the electrical circuits later. This central clutch member 31 is keyed on the shaft 29 so that it must rotate with said shaft, but is capable of sliding laterally thereon. The clutch member 31 is mounted between two clutch members 40, 41, of magnetic metal, mounted loosely on the shaft 29 and made fast respectively in any desired way to the pinion 28 and gear 30. The shaft 29 transmits rotation to the shaft 42 of the cable drum through suitable worm gearing 43. It will therefore be seen that for a given speed of the motor 23, the cable drum may be driven at two speeds, one high and the other low, depending upon whether the clutch connects the pinion 28 to drive the shaft 29, or connects the gear 30 to drive said shaft. If current is sent through one of the exciting coils of the clutch, the central clutch member will be drawn to engagement with the clutch member 40, thus causing the pinion 28 to rotate with shaft 29. This drives the cable drum at a compartively high speed. If current is sent through the other exciting coil of the clutch, the central clutch member 31, will be drawn into engagement with clutch member 41, thus setting the clutch member 40 free to rotate on the shaft 29, and causing clutch member 41 and gear 30 to rotate with the member 31. This transmits rotation to the cable drum at a comparatively low speed. The object of this speed varying mechanism will appear later.

In Fig. 5, I have shown the cylindrical cable drum 19 replaced by a double cone drum 19′. With a drum such as the latter, it will readily be seen that for a given speed of the drum shaft, the hoisting cable will travel at a greater lineal velocity when being unwound from the portions of the cone of greater diameter, as for near the center line thereof than from portions of lesser diameter more remote from the center line forming the bases of the two cones. The advantage of securing this variable speed will appear more fully from the description of the operation of the apparatus which will follow: Connected to the double pulley block 17 in any suitable manner as by straps 44, is a frame 45 in which I mount in any suitable way, a blower 46 to which is preferably directly connected an electric motor 47, to drive the said blower. The outlet of this blower is connected by means of any suitable duct 48 to a blowpipe coupling, consisting in the case shown, of a nozzle 49, slidable on the end of duct 48 against the tension of a coil spring 50; the said nozzle passing through a bushing 51 in a frame 52 secured to frame 45. The frame 52 carries two L-shaped supporting arms 53 and 54 adapted to engage and support a blow pipe 55 (see Figs. 2 and 3). The blower shown is a rotary blower of any suitable construction.

I do not herein claim as my invention any specific form of blow pipe, hence this may be of any suitable construction. The one which I have shown is a well known form, consisting of a bait 56 from which passes a tubular stem 57 provided with a handle 58, and terminating in a saucer-shaped head 59, into which is adapted to fit the head of the coupling nozzle 49. By pressing the nozzle 49 upward, the blow pipe may be readily removed from its supporting frame, and another placed therein.

An arrangement of electric circuits, connections and controlling devices for one of said units are shown diagrammatically in Fig. 9, where 60 represents a double voltage direct current generator set delivering current to three power mains 61, 62 and 63, from which current is tapped off for the apparatus at the several cylinder hoisting and blowing units. This generator set is adapted to deliver one voltage, 220 volts for example, at brush 64 and another, 70 volts for example, at brush 65; while the intermediate brushes 66 and 67 connect to the common return 63. The main 61 connects through series field 68 to the 220-volt brush 64, while the main 62 connects through series field 69 to the 70-volt brush 65. 70 represents the shunt field of the 220-volt generator.

Double voltage generator sets are well known in the electrical art and need not further be described here, since I do not claim any particular form. The armature of the hoisting motor 23 is connected to a double throw reversing switch 71, which is connected to a double throw switch 72, and these switches are so connected to the supply mains that when thrown in one direction current from the 70-volt circuit will be delivered to the hoisting motor to drive the said motor in one direction, and when thrown the other way will deliver current to the hoisting motor from the 220-volt circuit to run it in the opposite direction. Also the clutch coils 32 and 33 are so connected with the switch 71 that when said switch is thrown to drive the hoisting motor in one direction one clutch coil will be energized, and when thrown to drive the hoisting motor in the other direction the other clutch coil will be energized.

When the switches 71 and 72 are thrown as shown in the drawing, the circuits from the mains to the hoisting motor may be traced as follows: from 220-volt main 61, through tap-off wire 73, fixed resistance 74 placed there to prevent a too sudden inrush of current on the motor, contact 75, blade 76 and contact 77 of switch 72, connecting wire 78, contact 79, blade 80 and contact 81 of switch 71, conductor 82, armature of hoisting motor 23, conductor 83, contact 84, blade 85 and contact 86 of switch 71, tap-off wire 87, to common return 63.

The clutch coil circuit may be traced from the 70-volt main 62, through tap-off wire 88, contact 89, blade 90 and contact 91 of switch 71, conductor 92, clutch coil 32, through tap-off wire 93 to common return 63. The hoisting motor will then run in one direction on the 220-volt circuit and the magnetic clutch will couple the cable drum to the hoist motor shaft through the high speed gear 25—28 which is employed in lowering the blow-pipe.

It is preferable to lower the cylinders at a higher speed than that which may be employed in raising them from the molten glass, principally in order to save time. Therefore when the hoisting motor is reversed to lower the cylinder I run it on the 220-volt circuit, and high speed gear.

When raising a cylinder, as in the process of forming the same, I preferably operate the hoist motor on the 70-volt circuit and gear it to the cable drum through low speed gears 27—30. To do this, switches 71 and 72 are thrown to the opposite position from that in which their blades are shown in Fig. 9, and when these switches are so thrown the circuits from the mains to the hoist motor may be traced as follows: from 70-volt main 62, to contact 94, blade 76 and contact 77, of switch 72, connecting wire 78, contact 95, blade 80, contact 96, cross connection 97, and contact 84 of switch 71, conductor 83, armature of hoisting motor 23, conductor 82, contact 81, cross connection 98, contact 99, blade 85, contact 100, tap-off wire 87, to common return 63. The circuit to the clutch coil 33 may then be traced from the 70-volt main 62, through conductor 88, contact 89, blade 90 and contact 101 of switch 71, conductor 102, clutch coil 33, through tap-off wire 93 to the common return 63.

The shunt field 103 of the hoist motor is connected to the 220-volt circuit by means of conductors 104 and 93.

The motor 6, for rotating the crane may be connected to the 70-volt main 61, and to the common return 63, as shown, and may be provided with a starting rheostat 103, or other suitable controller.

The blower motor 47 is operated preferably on the 70-volt circuit and is provided with a rheostat or other suitable controller 105 connected in circuit therewith between the main 62 and the motor, or in any other suitable location, to vary the speed of said motor. The controller 105 is for manual operation. Also connected in circuit with blower motor 47 is a rheostat or other suitable speed controller 106, connected between the said motor and the common return 63, or otherwise suitably located. This controller 106 is for automatic actuation either directly or indirectly by the hoisting of the cylinder in forming the same. The arrangement which I have herein shown for actuating this rheostat consists in connecting to its movable contact 107 a sprocket wheel 108 which is geared by means of sprocket chain 109 to a sprocket wheel 110 mounted on the shaft of the cable drum 19, of the hoisting apparatus. This electrical control of the blower constitutes a very important feature of this invention and its objects and advantages will be readily apparent from the description of the operation of the apparatus which is to follow.

The tank furnace which I have herein shown operating with the mechanism above described, consists, among other parts, of a main heating chamber 111 in which the glass material is reduced to a molten state by means of gas introduced therein through burners 112, as is the common practice, or in any other suitable way. Located at one end of this heating chamber is the tank 113 between which and said heating chamber there is a submerged wall 114 of suitable refractory material, the top of which is normally a few inches below the surface of the molten glass. This tank 113 which extends to each side of the heating chamber forms a T-shaped structure as shown.

At suitable intervals down the center of the tank 113 are located a series of vertical flues 115 of suitable refractory material, extending from the top of the tank down to the bottom thereof and communicating each with an air space 116. This air space may be formed by supporting the bottom of the tank upon I-beams 117, which may be railroad rails or other suitable supports properly spaced apart and supported upon a suitable foundation 118. The flues 115 are in reality pillars or supports for the arches 119 and ordinarily would be solid. These pillars are subject, however, to great heat and when solid, due to their lack of power to radiate heat fast enough, rapidly deteriorate. By making them hollow in the form of flues 115 and permitting air from the outside to pass through the same as herein described, enough heat is radiated to greatly prolong the life of these supports.

The openings into the tank through which the cylinders are drawn are formed by a series of arches 119 of suitable refractory material extending from the said flues to the side walls of the tank and between flues, and located above the normal level of the glass, as shown. For each of said glass drawing openings in said tank I provide a cap stone 120 consisting of a slab of refractory material having through its center a preferably circular opening 121 which may be 60 inches in diameter or any other suitable size. Each of these cap stones is of such shape as to conform to the particular arrangement of the arches 119, forming the sides of the opening with which a particular cap stone is used, as shown in Fig. 6.

The cap stones may be supported each by means of chains 122 connected thereto on opposite sides of the opening 121. The chains 122 are supported by chains 123 adapted to wind on shafts 124 journaled in horizontal brackets 125 secured to uprights 126. The shafts 124 may be rotated to wind or unwind chains in raising and lowering said cap stones, by connecting said shafts through sprocket gearing 127, or otherwise, with winding cranks 128. Any other suitable means may, however, be employed for supporting and raising and lowering the cap stones. The sides 129 of the tank are lower than the top of the center of the tank to permit the cap stones to be readily placed in position and removed.

For each of the openings in the tank through which cylinders are to be drawn I provide a separate hoisting and blowing unit and locate these around the tank as indicated diagrammatically by the circles 130, Fig. 7. These cylinder forming units therefore all draw glass from a common receptacle which, in this case, is the tank. This arrangement is extremely advantageous in that it eliminates practically all the labor required in manipulating pots or other receptacles into which, according to present practiced methods of glass manufacture, the molten glass is placed to be drawn from. I am not aware of any apparatus other than that constituting my invention, wherein the glass cylinders are machine made, wherein the cylinders are formed direct from the glass in the tank, or in which a plurality of cylinder forming units draw glass from a chamber common to two or more such units.

Assuming that the bait has been lowered into the glass in the tank, the operation of forming a cylinder with the apparatus herein described is as follows: The switches 71 and 72 are thrown as hereinbefore described to connect the hoist motor and the clutch coils to the 70-volt supply circuit. The magnetic clutch in this case connects the cable drum to the hoisting motor through the low speed gearing, as hereinbefore fully described. The movable contact of the hand rheostat 105 is moved from the "off" position to a desired position on the resistance contacts, which position is left to the judgment of the operator. When the hoisting mechanism starts up, the movable contact of rheostat 106 commences to rotate and is so adjusted that when the bait is lowered into the molten glass and the drawing is about to commence, it will commence to introduce resistance into the blower-motor circuit. During the blowing of the cap, the operator of rheostat 105 shifts its movable contact to cut out almost all of its resistance from the blower-motor circuit, and the moving contact of rheostat 106 is cutting out resistance. When the cap is formed and cylinder commences to be formed, the movable contact of hand rheostat 105 is placed in position to leave about half of the resistance of that rheostat in the blower motor circuit, and is left in that position throughout the rest of the cylinder forming process, unless the operator finds it necessary to move it to vary the blowing.

From the time the cap is formed until the cylinder is about one fourth drawn the resistance of automatic rheostat 106 is being gradually cut out by the rotation of its traveling contact 107, and at the end of the first quarter of the drawing, about three fourths of its resistance is in the blower motor circuit. When the cylinder is about half drawn, about half of the resistance of the rheostat 106 will be cut in, and when the cylinder is about three quarters drawn, about three quarters of the resistance of rheostat 106 will be cut out. At the end of the drawing the moving contact of rheostat 106 will have traveled for enough to short circuit the resistance of that rheostat, and the moving contact of hand rheostat 105 is moved to the "off" position and blower motor stopped. The hoisting mechanism is then stopped by opening switch 72 and the cylinder cut off in any desired manner. The hoisting mechanism is then started up again and the cylinder raised sufficiently to clear the top of the tank in being swung by the crane. The crane-rotating motor is then started up by means of controller 103. The crane is thus rotated to the desired position and the cylinder taken down.

It will be observed that after the cap has been formed and the operator of hand rheostat 105 has set the moving contact therefrom a desired point where it may remain until the end of the drawing, that the blower will run at a gradually increasing speed regulated automatically by the rheostat 106, which gradually cuts out resistance from blower-motor circuit as the drawing proceeds.

If the conical drum, Fig. 4, is substituted for the cylindrical drum, Fig. 5, for a given speed of the drum shaft the cable may be made to unwind with an increasing linear velocity and may be made to wind up with a decreasing linear velocity or vice versa, thereby automatically varying the speed of the cable independent of the rate of rotation of the shaft of the drum. This is advantageous in that it is desirable to increase the rate at which the cylinder is raised from the molten glass in drawing and also to decrease the rate at which it is lowered when taken down or when the blow pipe is lowered into the molten glass.

Placing the blower close to the blow pipe as herein described and shown, produces a more effective, uniform and quick acting regulation than when the air pressure is conducted through long tubes from one central pressure supply device, commonly called an airometer, operated by mechanically controlled valves or stop-cocks, which has hitherto been the practice in this art, and which has the disadvantage of causing a simultaneous reduction of the air supply, if the various machines should happen to be operated simultaneously.

Another advantage possessed by the present invention is the drawing of glass directly out of the main supply tank, permitting a uniformity of fluidity to the molten glass, not generally acquired when the molten glass is transferred from the main supply tank to the pots by a process known in the art as ladling. This invention dispenses with the labor of ladling, a process of manual labor required in transferring the molten glass metal from the main supply furnace or tank to the pot or other receptacle from which it is drawn by the blow pipe. This process in transferring by manual labor, the molten glass metal substantially as described, limits the size at which cylinders can be blown by the physical capacity of the laborer engaged as a ladler. With my invention there is practically no limit to the size of cylinders which may be drawn.

The tank and its accessories *per se* herein described, may be used with cylinder drawing or glass working apparatus other than the form which I herein show as operating in conjunction therewith, and, likewise, the glass drawing or working apparatus *per se* embodying my invention may be used with other styles of furnace, so that I do not desire in all cases to be limited to the use of one of these forms of apparatus with the other. Moreover, I do not desire to limit my invention in all cases to the formation of cylinders, since some parts of the apparatus constituting my present invention may be used for drawing or working glass into other forms.

What I do claim as my invention is:

1. Apparatus for working glass, comprising hoisting means, electrically operated blowing means, and an electrical controller controlled by the hoisting means to automatically control the blowing means.

2. Apparatus for working glass, comprising cylinder hoisting means, electrically operated cylinder blowing means, and an electrical controller controlled by the hoisting means to automatically control the blowing means.

3. Apparatus for the manufacture of glass, comprising a receptacle for molten glass, a blow pipe, hoisting means connected to said blow pipe to lower the same into said glass and to withdraw the same therefrom, electrically driven mechanism to deliver fluid through said blow pipe, and an electrical controller controlled by the hoisting means to automatically control the delivery of said fluid to said blow pipe.

4. Glass working apparatus, comprising a blow pipe, a blower connected to deliver a blast direct to said blow pipe, an electric motor connected to drive said blower, and automatically operated electrical means to vary the speed of said motor and acting therethrough to vary the blast from said blower.

5. Glass working apparatus, comprising a blow pipe, a blower connected to deliver a blast direct to said blow pipe, an electric motor connected to drive said blower, automatically operated electrical means to vary the speed of said motor and acting therethrough to vary the blast from said blower, and hand operated electrical means to also control said blower motor.

6. Apparatus for working glass, comprising a receptacle for molten glass, a blow pipe, hoisting mechanism supporting said blow pipe for vertical movement to and away from the mass of molten glass in said receptacle, a blower connected to deliver a blast to said blow pipe, an electric motor connected to said blower to operate the same, electrical controlling means connected to said motor to control its speed, and operative mechanical connection between said hoisting mechanism and said controlling means whereby the said controlling means is actuated to automatically control the speed of said blower motor.

7. Apparatus for working glass, comprising a receptacle for molten glass, a blow pipe, hoisting mechanism supporting said blow pipe for vertical movement to and away from the mass of molten glass in said receptacle, a blower connected to deliver a blast to said blow pipe, an electric motor connected to said blower to operate the same, electrical controlling means connected to said motor to control its speed, operative mechanical connection between said hoisting mechanism and said speed controlling means whereby the said speed controlling means is actuated to automatically control the speed of said blower-motor, and hand operated electrical speed controlling means connected in the circuit of said blower motor.

8. In glass manufacturing apparatus, the combination with variable speed hoisting mechanism, comprising a cable drum, an electric motor, speed changing gears to connect said motor to drive said drum, an electro-magnetic clutch adapted to change the gear connection between the said motor and the drum from gearing adapted to give one speed to gearing adapted to give another speed to said drum, means to operate said motor and clutch, a crane, pulleys on said crane, and a hoisting cable adapted to pass over said pulleys and wind on said drum, of a supporting frame connected to said cable to be raised and lowered thereby, a blower mounted on said frame, an electric motor connected to said blower to drive the same, a blow pipe supported by said frame, a duct connecting said blow pipe to said blower, an electric circuit for operating said blower motor, a speed controlling rheostat connected in said circuit to vary the speed of said blower motor, and operative connection between said rheostat and said hoisting mechanism whereby the blast from said blower to said blow pipe is automatically varied by the raising of said blow pipe by said hoisting mechanism.

9. In glass manufacturing apparatus, the combination with variable speed hoisting mechanism, comprising a cable drum, an electric motor, speed changing gears to connect said motor to drive said drum, an electro-magnetic clutch adapted to change the gear connection between the said motor and the drum from gearing adapted to give one speed to gearing adapted to give another speed to said drum, means to operate said motor and clutch, a crane, pulleys on said crane, and a hoisting cable adapted to pass over said pulleys and wind on said drum, of a supporting frame connected to said cable to be raised and lowered thereby, a blower mounted on said frame, an electric motor connected to said blower to drive the same, a blow pipe supported by said frame, a duct connecting said blow pipe to said blower, an electric circuit for operating said blower motor, a speed controlling rheostat connected in said circuit to vary the speed of said blower motor, operative connection between said rheostat and said hoisting mechanism whereby the blast from said blower to said blow pipe is automatically varied by the raising of said blow pipe by said hoisting mechanism, and a hand operated rheostat also in circuit with the said blower motor to control the same.

10. In glass manufacturing apparatus, the combination with a blow pipe, of a rotary blower located in close proximity to said blow pipe and connected to deliver a blast thereto, an electric motor connected to said blower to operate the same, an electric circuit on which said motor is operated, and electrical means to vary the speed of said motor to regulate said blast.

11. In glass manufacturing apparatus, the combination with variable speed hoisting mechanism comprising, an electric motor, speed varying gear adapted to connect with said motor, a magnetic clutch operating in conjunction with said gears, and hoisting means connected to be driven by said motor through said gearing and clutch, of a source of electrical energy, circuit changing switches to connect said source of energy to said motor and clutch, and glass blowing apparatus operatively connected to said hoisting means to be raised and lowered thereby.

12. In glass manufacturing apparatus, the combination with electrically operated hoisting mechanism, of glass blowing apparatus operatively connected thereto to be raised and lowered thereby, a double voltage electrical supply circuit, and current reversing circuit changing switches adapted to connect said circuit to operate said hoisting mechanism in one direction on one voltage and in an opposite direction on the other voltage.

13. Glass manufacturing apparatus, comprising a glass furnace having a main tank for molten glass, and a heating chamber in which the glass is reduced to a molten state, said tank communicating directly with said chamber, a plurality of cap stones located in said tank and extending above the level of the glass therein, each of said cap stones comprising a slab of refractory material having an opening therethrough, mechanism to support said cap stones for vertical movement, and mechanism adapted to form glass articles by drawing the same from the molten glass in said tank through said openings in said cap stones.

14. Glass drawing apparatus, comprising a blower, a blow pipe connected to said blower to receive air therefrom, means to drive said blower, and hoisting means adapted to raise and lower said blow pipe and blower together in the operation of the apparatus.

15. Glass drawing apparatus, comprising a rotary blower, an electric motor connected to drive said blower, a blow pipe, a short air conducting connection between said blower and blow pipe, a frame supporting said parts, and hoisting mechanism connected to said frame whereby the said motor, blower and blow pipe may be raised and lowered together in the operation of the mechanism.

16. Apparatus for drawing glass articles from a mass of molten glass, comprising a receptacle for the molten glass, a movable support, a blow pipe, means to force a blast of air through said blow pipe during the drawing process, a flexible hoisting suspension, a blow pipe supporting device connected to said suspension, the said blow pipe being removably connected to said blow pipe supporting device, and the said blow pipe and its supporting device freely suspended by said suspension from said movable support to be lowered into the glass in said tank and raised therefrom during the drawing process, the said movable support being constructed and arranged to transport the freely suspended blow pipe with the drawn article depending therefrom from the drawing position over the glass in the tank to a taking down position.

17. Apparatus for drawing glass articles from a mass of molten glass, comprising a tank for the molten glass, a movable crane, a blow pipe, a blower connected to said blow pipe to deliver a blast therethrough, an electric motor connected to drive said blower, a carriage supporting said blow pipe, blower and motor, a flexible hoisting cable by which said carriage is freely suspended from said crane, and means coöperating with said cable to raise and lower said carriage and said parts carried thereby, whereby the blow pipe may be let down into the molten glass in said tank and drawn upward therefrom in the drawing process, the said movable crane adapted to transport the drawn article from the drawing position over the molten glass in said tank to a taking down position away therefrom.

18. Apparatus for drawing glass articles from a mass of molten glass, comprising a receptacle for the molten glass, a revoluble crane, a blow pipe, means to force a blast of air through said blow pipe during the drawing process, a blow pipe supporting device to which said blow pipe is removably attached, a flexible suspension by which said blow pipe and its supporting device are freely suspended from said crane, and means coöperating with said suspension to lower said blow pipe into said glass and draw the same upward therefrom in the drawing process, the said revoluble crane constructed and arranged to swing the drawn article depending from the freely suspended blow pipe, from the drawing position over the molten glass to a taking down position away therefrom.

19. Apparatus for drawing glass articles from a mass of molten glass, comprising a glass tank containing the molten glass, a refractory body having an opening therethrough, mechanism supporting said body for movement with relation to the body of the glass in said tank, a blow pipe, mechanism constructed and arranged to support and lower said blow pipe into the body of the molten glass in said tank through said opening in said refractory body, and to draw said blow pipe upward therefrom in the drawing process, and means to supply a blast of air through said blow pipe during the drawing process.

20. The combination with the main tank of a glass furnace containing molten glass, of a blow pipe, mechanism to lower said blow pipe into the mass of said molten glass in the main tank of said furnace and to withdraw said blow pipe therefrom, means to force fluid into said blow pipe, and electrical means to control said fluid, the said apparatus being adapted to draw glass cylinders direct from the mass of molten glass in said main body of the tank.

In testimony whereof I affix my signature in presence of two witnesses.

RICHARD H. BOLIN.

Witnesses:
WILLIAM WALDEN McDADE,
HENRY E. SHAFFER.